United States Patent
Ananthapadmanabh et al.

(10) Patent No.: US 9,122,328 B2
(45) Date of Patent: *Sep. 1, 2015

(54) DETECTING AND HANDLING UNINTENTIONAL TOUCHING OF A TOUCH SCREEN

(71) Applicant: INTERNATIONAL BUSINESS MACHINES CORPORATION, Armonk, NY (US)

(72) Inventors: Madhu B. Ananthapadmanabh, Bangalore (IN); B. G. Prashanth Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 13/629,904

(22) Filed: Sep. 28, 2012

(65) Prior Publication Data

US 2014/0092024 A1    Apr. 3, 2014

(51) Int. Cl.
*G06F 3/041* (2006.01)
*G06F 3/0488* (2013.01)
*G06F 1/16* (2006.01)

(52) U.S. Cl.
CPC .............. *G06F 3/041* (2013.01); *G06F 3/0416* (2013.01); *G06F 3/0488* (2013.01); *G06F 1/1694* (2013.01)

(58) Field of Classification Search
USPC .................................................. 345/173–179
See application file for complete search history.

(56) References Cited

U.S. PATENT DOCUMENTS

| | | | |
|---|---|---|---|
| 2005/0184972 | A1 | 8/2005 | Tashiro et al. |
| 2010/0134424 | A1 | 6/2010 | Brisebois et al. |
| 2011/0021251 | A1 | 1/2011 | Linden |
| 2011/0057907 | A1 | 3/2011 | Kim et al. |
| 2011/0261058 | A1 | 10/2011 | Luo |
| 2011/0316888 | A1 | 12/2011 | Sachs et al. |
| 2012/0032979 | A1 | 2/2012 | Blow et al. |
| 2012/0154294 | A1 | 6/2012 | Hinckley et al. |
| 2012/0262407 | A1* | 10/2012 | Hinckley et al. ............... 345/173 |
| 2012/0280917 | A1 | 11/2012 | Toksvig et al. |
| 2013/0100062 | A1 | 4/2013 | Lee |
| 2013/0207905 | A1 | 8/2013 | Hankins et al. |

OTHER PUBLICATIONS

Kate Greene, "A Better Touch Screen", Technology Review, Published by MIT, Nov./Dec. 2007, pp. 1-2.
U.S. Appl. No. 14/045,260: Non-Final Office Action mailed Oct. 23, 2014.

* cited by examiner

*Primary Examiner* — Robin Mishler
(74) *Attorney, Agent, or Firm* — Law Office of Jim Boice

(57) ABSTRACT

A processor-implemented method, system, and/or computer program product detects and handles an unintentional touching of a touch screen in order to prevent unintentional inputs to the touch screen. An unintentional touching of touch screen, as determined by one or more predefined events, causes a predetermined region of the touch screen to be disabled.

13 Claims, 4 Drawing Sheets

DETECTING AND HANDLING UNINTENTIONAL TOUCHING OF A TOUCH SCREEN

BACKGROUND

The present disclosure relates to the field of computers, and specifically to the use of computers that utilize touch screens. Still more particularly, the present disclosure relates to the management of touch screens.

Many computing devices, including portable devices such as laptops, tablet computers, smart phones, etc., have a touch screen. A touch screen includes a touch-sensitive grid which is overlaid on, or is integral to, a video display. Such a touch screen allows a user to enter inputs by directly touching the touch screen, rather than using other input devices such as a mouse, a keyboard, etc.

SUMMARY

A processor-implemented method, system, and/or computer program product detects and handles an unintentional touching of a touch screen in order to prevent unintentional inputs to the touch screen. An unintentional touching of touch screen, as determined by one or more predefined events, causes a predetermined region of the touch screen to be disabled.

DETAILED DESCRIPTION

Figure 1:
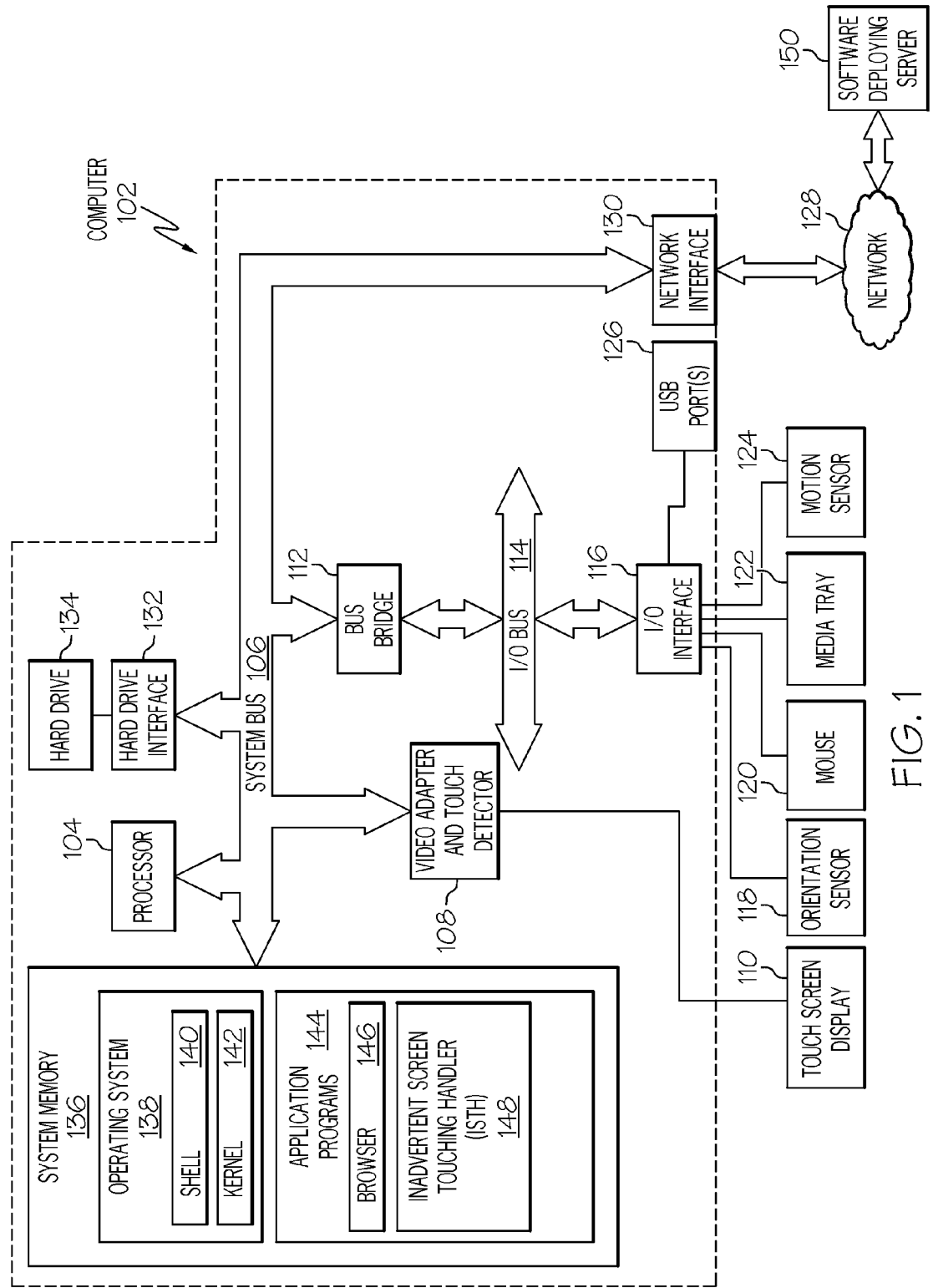
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a touch screen display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including an orientation sensor 118, a mouse 120, a media tray 122 (which may include storage devices such as CD-ROM drives, multi-media interfaces, etc.), a motion sensor 124, and external USB port(s) 126. While the format of the ports connected to I/O interface 116 may be any known to those skilled in the art of computer architecture, in one embodiment some or all of these ports are universal serial bus (USB) ports.

The touch screen display 110 includes a touch-sensitive grid which is overlaid on, or is integral to, a video display. Touch screen display 110 allows a user to enter inputs by directly touching the touch screen display 110.

The orientation sensor 118 is a sensor and/or associated logic that senses the physical/spatial orientation of the computer 102. For example, a simple gravity detector can tell if the computer is being held right-side-up, upside down, parallel to or perpendicular to the ground (e.g., a walking surface), at some other angle relative to the ground, etc. In another example, the orientation sensor 118 is a set of accelerometers, strain gauges, etc. that provide real-time information describing the physical orientation of the computer 102 in three-dimensional space, including such orientation with respect to the earth/ground/floor.

The motion sensor 124 is a sensor and/or associated logic that senses the direction, speed, and/or acceleration of movement of the computer 102. For example, a combination of accelerometers, strain gauges, etc. (described above with respect to the orientation sensor 118) can also be used to detect how fast and in what direction the computer 102 is moving, as well as the acceleration of movement of the computer 102. For example, the motion sensor 124, either alone or in combination with the orientation sensor 118 described above, is able to detect if the computer 102 is being handed from one person to another based on the rate of acceleration during the hand-off (e.g., faster than normal walking acceleration), the yaw orientation of the computer 102 during the hand-off (e.g., a rotating movement indicating that the computer is being turned around for another person to see during a hand-off of the computer from one person to another), the pitch orientation of the computer 102 during the hand-off (e.g., the front of the computer 102 being tilted upwards during the hand-off of the computer from one person to another), and/or the roll orientation of the computer 102 during the hand-off (e.g., a side of the computer rolling upwards during the hand-off of the computer of the computer from one person to another). In one embodiment, the motion sensor 124 (alone or in combination with the orientation sensor 118) is able to detect an oscillating motion of the computer 102, such as that motion created with a user is walking and holding a tablet computer in her hand (and at her side) while swinging her arms forward and backward.

Note also that, in one embodiment, computer 102 may be a tablet computer, a laptop computer, a smart phone, or any other computing device that is portable and has a touch screen such as touch screen display 110.

As depicted, computer 102 is able to communicate with a software deploying server 150 using a network interface 130 to a network 128. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an inadvertent screen touching handler (ISTH) 148. ISTH 148 includes code for implementing the processes described below, including those described in FIGS. 3-4. In one embodiment, computer 102 is able to download ISTH 148 from software deploying server 150, including in an on-demand basis, wherein the code in ISTH 148 is not downloaded until needed for execution. Note further that, in one embodiment of the present invention, software deploying server 150 performs all of the functions associated with the present invention (including execution of ISTH 148), thus freeing computer 102 from having to use its own internal computing resources to execute ISTH 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
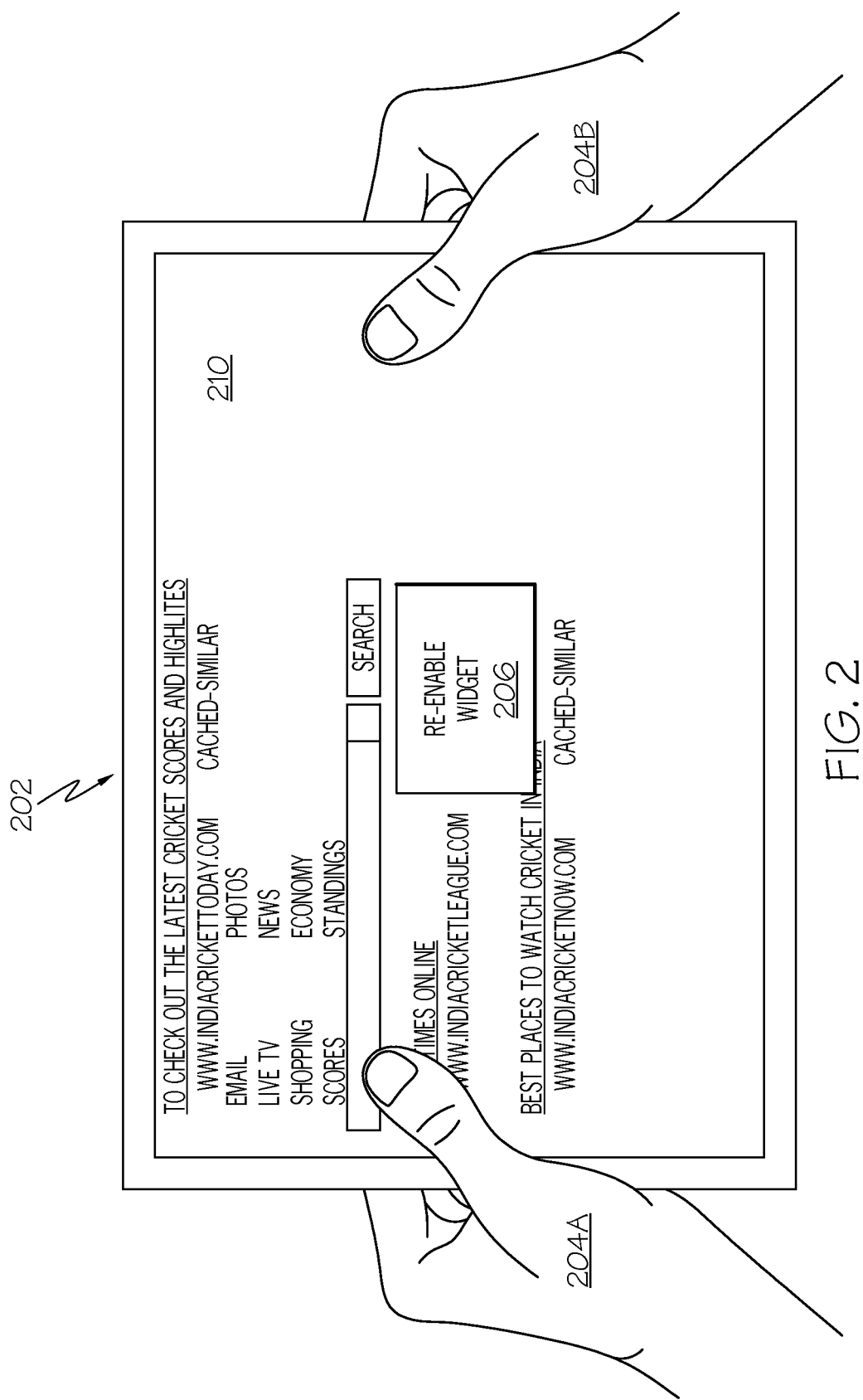
FIG. 2 illustrates an exemplary portable device having a touch screen on which the present invention may be implemented.

With reference now to FIG. 2, an exemplary portable computing device 202 (e.g., computer 102 shown in FIG. 1) having a touch screen 210 (e.g., touch screen display 110 shown in FIG. 1) on which the present invention may be implemented is presented. In the example shown in FIG. 2, portable computing device 202 is a tablet computer. Note that, due to the size and shape of portable computing device 202, it is possible for a user's hands 204a-204b to inadvertently touch the touch screen 210 when grabbing the portable computing device 202 with both hands (as depicted), when holding the portable computing device 202 down by one's side while carrying it, when passing the portable computing device 202 to another person, etc. In accordance with the present invention, such inadvertent/accidental/unintentional touching of the touch screen 210 results in some or all of the real estate (i.e., surface area) of the touch screen 210 being disabled and/or powered off.

Figure 3:
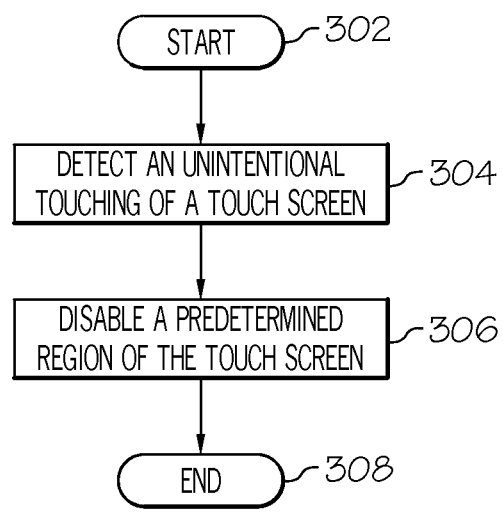
FIG. 3 is a high level flow chart of one or more exemplary steps performed by a processor to detect and handle unintentional touches to a touch screen.

With reference now to FIG. 3, a high level flow chart of one or more exemplary steps performed by a processor to detect and handle unintentional touches to a touch screen is presented. After initiator block 302, a processor detects an unintentional touching of a touch screen on a portable computing device (block 304). Detecting such unintentional touching is performed in one or more different ways.

In one embodiment, the processor determines that there has been an unintentional touching of the touch screen by detecting that an area that is larger than a predetermined area is being touched on the touch screen. That is, the processor utilizes sensor output from the touch screen as inputs to logic such as ISTH 148 described above, in order to determine that there has been an unintentional touching of the touch screen. For example, assume that a program is designed to accept inputs from the touch screen that are created by the user's fingertips (e.g., when typing on an on-screen keyboard, activating a button/widget/link, etc.) touching the touch screen. A typical user's fingertip may be predetermined to have a surface area of 100-200 mm². Assume further that a particular program, which is currently running on the portable computing device, is designed to look for a single fingertip touch at a time (i.e., the user is to touch the touch screen with only one finger at a time), such as a program that accepts on-screen keyboard inputs. If the touch screen detects that 1000 mm² of the touch screen is being covered by the user's hands/fingers, then the portable computing device (e.g., computer 102 shown in FIG. 1) determines (e.g., by executing instructions from ISTH 148 shown in FIG. 1) that there is an inadvertent touching of the touch screen, since clearly more than a single fingertip (e.g., the user's palms, several fingers, etc.) is touching the touch screen.

In one embodiment, the processor further determines that there has been an unintentional touching of the touch screen by determining that the touch screen is moving in an oscillating motion while the area that is larger than the predetermined area is being touched on the touch screen. By using sensor output from the motion sensor 124 and/or orientation sensor 118 described above as data inputs to ISTH 148 shown in FIG. 1, as well as the sensor outputs from touch screen display 110 indicating that too many fingers and/or the user's palms are touching the screen, the ISTH 148 is able to generate a conclusion that there is unintentional touching of the touch screen with greater confidence. That is, if a user is holding the portable computing device while swinging her arms back and forth (i.e., in a normal walking motion), then ISTH 148 is able to conclude with confidence that any detected touching of the touch screen is inadvertent. As stated above, in one embodiment this conclusion is predicated on more than a predetermined area of the touch screen being touched (e.g., the user's palms are touching the touch screen, rather than just one or two of her fingertips). However, in another embodiment, the conclusion that there is inadvertent touching of the touch screen is based on any touching of the touch screen while the portable computing device is moving in an oscillating motion.

In one embodiment, the processor further determines that there has been an unintentional touching of the touch screen by determining that the touch screen is accelerating beyond some predetermined acceleration rate while an area that is larger than the predetermined area is being touched on the touch screen. By using sensor output from the motion sensor 124 and/or orientation sensor 118 described above as data inputs to ISTH 148 shown in FIG. 1, as well as the sensor outputs from touch screen display 110 indicating that too many fingers and/or the user's palms are touching the screen, the ISTH 148 is able to generate a conclusion that there is unintentional touching of the touch screen with greater confidence. That is, if a user is handing the portable computing device to another person, this motion (i.e., acceleration) is often faster (e.g., has a higher acceleration) than a person simply carrying the portable computing device. During this hand-off, it is likely that the user does not intend to make any inputs to the touch screen, and thus any touching of the touch screen is unintentional. In one embodiment, this conclusion is predicated on more than a predetermined area of the touch screen being touched (e.g., the user's palms are touching the touch screen, rather than just one or two of her fingertips). As stated above, in one embodiment this conclusion is predicated on the rate of acceleration begin beyond some predetermined acceleration rate. However, in another embodiment, the conclusion that there is inadvertent touching of the touch screen is based on any touching of the touch screen while the portable computing device is accelerating beyond some predetermined acceleration rate.

In one embodiment, the processor determines that there has been an unintentional touching of the touch screen by determining that the touch screen is facing downward. By using sensor output from the motion sensor 124 and/or orientation sensor 118 described above as data inputs to ISTH 148 shown in FIG. 1, the ISTH 148 is able to generate a conclusion that the portable computing device is upside-down, which is an unlikely orientation when input is deliberately being entered on the touch screen. In one embodiment, this conclusion is predicated on more than a predetermined area of the touch screen being touched (e.g., the user's palms are touching the touch screen, rather than just one or two of her fingertips). However, in another embodiment, the conclusion that there is inadvertent touching of the touch screen is reached whenever there is a touch-screen input while the portable computing device is physically oriented in an upside-down position (e.g., is being held upside down by a user).

In one embodiment, the processor determines that there has been an unintentional touching of the touch screen by determining that the touch screen is oriented perpendicular to a walking surface. By using sensor output from the motion sensor 124 and/or orientation sensor 118 described above as data inputs to ISTH 148 shown in FIG. 1, the ISTH 148 is able to generate a conclusion that the portable computing device is being held perpendicular to the ground (e.g., a walking surface), which is an unlikely orientation when input is deliberately being entered on the touch screen. In one embodiment, this conclusion is predicated on more than a predetermined area of the touch screen being touched (e.g., the user's palms are touching the touch screen, rather than just one or two of her fingertips). However, in another embodiment, the conclusion that there is inadvertent touching of the touch screen is reached whenever there is a touch-screen input while the portable computing device and the touch screen are physically oriented perpendicular to the ground (e.g., at the person's side facing away from the person, such as when the person is carrying the portable computing device).

In one embodiment, the processor determines that there has been an unintentional touching of the touch screen by detecting that a predefined perimeter area of the touch screen is being touched for longer than a predetermined length of time. By using sensor output from the touch screen display 118, which detects which area of the touch screen is being touched, the ISTH 148 is able to generate a conclusion that touching of the touch screen is inadvertent if it lasts too long (e.g., more than three seconds). For example, assume that a typing program is running on the portable computing device, and that this typing program is displaying a touch-keyboard on the touch screen. If the user's hands/fingers touch a predefined perimeter area of the touch screen (e.g., the outer one inch perimeter) continuously for more than three seconds, the ISTH 148 is able to generate a conclusion that the user is merely gripping the portable computing device. As such, this gripping (which includes the user's fingertips wrapping across the perimeter of the touch screen) are deemed to be an inadvertent touching of the touch screen.

In one embodiment, assume that several fingertips are inadvertently touching the touch screen. In this embodiment, if only the touched area is to be disabled, then a polygon formed by connection lines between each fingertip-touched area is disabled. Alternatively, only the area below where the fingertips actually touch will be disabled.

In one embodiment, the processor determines that there has been an inadvertent touching of the touch screen based on the time, day of the week, calendar date, etc. That is, the processor defines, using ISTH 148 and/or manually inputted information from a user, certain times/days/dates that inputs are not authorized and/or expected. For example, assume that a user walks from his office to the subway every day from 5:00 to 5:15. It is unlikely that the user would be inputting data into his tablet computer during that time. Thus, ISTH 148 will ignore any touching of the touch screen during this time period, since the user is probably just carrying the tablet computer (without entering data) during his walk. Similarly, a user may tell ISTH 148 that he only uses the portable computing device to watch streaming video on the weekends. Thus, if a word processing program should inadvertently start running on that tablet computer, ISTH 148 will ignore any attempted inputs to the touch-screen keyboard that has been initiated with the word processing program.

As described in block 306, in response to detecting the unintentional touching of the touch screen, the processor disables a predetermined region of the touch screen. This disabling prevents all unintentional inputs to the touch screen, both in the future as well as since the unintentional touching event. In one embodiment, the disabling is caused by instructing the ISTH 148 to simply ignore any inputs (i.e., inadvertent/unintentional touching) from the touch screen. In one embodiment, the disabling is caused by turning off power to the predetermined region of the touch screen, thus conserving battery power.

In one embodiment, the area of the touch screen that is disabled is just the area that is being touched. For example, if ISTH 148 determines that the area being touched by hands 204a-204b in FIG. 2 is not intentionally being touched (e.g., the user is not intending to cause an input to be entered onto the touch screen 202), then just the area under the hands 204a-204b is disabled, allowing the rest of the touch screen 202 to remain enabled. In one embodiment, if inadvertent touching is detected, then the entire touch screen is disabled (except for a re-enable widget 206), thus preventing any possible input via the touch screen. In either embodiment, the re-enable widget 206 (shown in FIG. 2) remains active and viable, such that when the user touches the re-enable widget 206, the previously disabled portion of the touch screen is revived (re-enabled).

In one embodiment, widget 206 and its activation is not required to re-enable the disabled portion of the touch screen. Rather, when ISTH 148 determines that the touch screen 202 is no longer being inadvertently touched (i.e., there are no longer any sensor outputs from the touch screen 202 indicating that the touch screen 202 is being touched), then ISTH 148 automatically re-enables the disabled portion of the touch screen.

Figure 4:
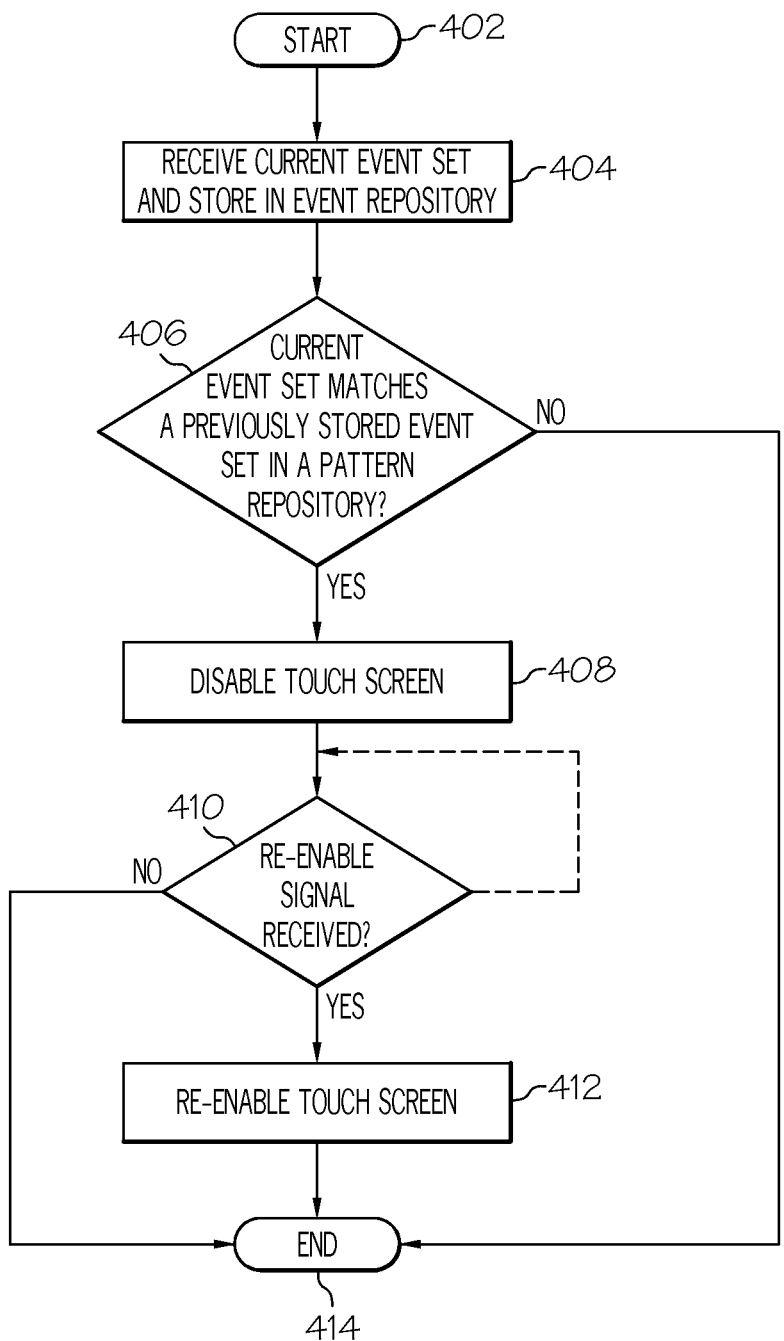
FIG. 4 is a high level flow chart that presents additional detail of one embodiment of the processor-implemented method described in FIG. 3.

With respect to FIG. 4, a high level flow chart that presents additional detail of one embodiment of the processor-implemented method described in FIG. 3 is presented. After initiator block 402, a current event set is received and stored in an event repository (block 404). That is, a combination of sensor outputs from the touch screen display 110, the orientation sensor 118, and/or the motion sensor 124 shown in FIG. 1 reflect a touching of the touch screen, potentially in conjunction with the touch screen (i.e., as part of a mobile computing device), describe an event set. This event set (which shows possibly unintentional touching of the touch screen) is stored in an event repository.

As described in query block 406, a determination is made as to whether the received and/or stored current event set matches a previously stored event set in a pattern repository. That is, the current event set (e.g., touching of the touch screen in a certain manner while the mobile computing device is in a certain physical position) is compared to other previously stored event sets in the pattern repository. These patterns may be recorded from previous unintentional touchings of the touch screen, or they can be manually entered by a user through an interface. If there is a pattern match to an event set that has been previously determined to indicate that the screen touching is unintentional, then some or all of the touch screen is disabled (block 408). However, if there are no matches to event sets in the pattern repository (query block 406), then the process ends at terminator block 414.

Returning to block 408, after the touch screen has been disabled, in one embodiment the user can manually re-enable the touch screen (to allow it to receive new inputs) by clicking the re-enable widget 206 shown in FIG. 2. If the user touches this re-enable widget (query block 410), then the touch screen is re-enabled (block 412), thus allowing the user once again to input commands to the touch screen. Otherwise, the process reiterates at query block 410, or else terminates at terminator block 414. As noted above, in one embodiment, the user does not need a re-enable widget 206 if the portable computing device detects that there is no longer any inadvertent touching of the touch screen. In this embodiment, the touch screen is automatically re-enabled either immediately after the touch screen is no longer inadvertently touched (according to the parameters discussed herein), or after some predetermined length of time (e.g., three seconds) after the touch screen is no longer being inadvertently touched.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product for detecting and handling an unintentional touching of a touch screen, the computer program product comprising a tangible computer readable storage medium having program code embodied therewith, the program code readable and executable by a processor to perform a method comprising:
   detecting an unintentional touching of a touch screen, wherein the touch screen is a component of a portable computing device that comprises an orientation sensor;
   in response to detecting the unintentional touching of the touch screen, disabling a predetermined region of the touch screen, wherein said disabling prevents unintentional inputs to the touch screen;
   receiving outputs from the orientation sensor indicating that the portable computing device is being handed from a first person to a second person, wherein the orientation sensor detects acceleration, yaw, pitch and roll movement indicative of the portable computing device being handed from the first person to the second person, and wherein the yaw is a rotating movement of the portable computing device indicating that the portable computing device is being turned around for the second person to see during a hand-off of the portable computing device from the first person to the second person; and
   in response to detecting that the portable computing device is being handed from the first person to the second person based on received outputs from the orientation sensor, blocking all touch inputs to the touch screen while the portable computing device is being handed from the first person to the second person.

2. The computer program product of claim 1, wherein the program code is further readable and executable by the processor to:
   determine that the touch screen is being unintentionally touched by detecting that an area that is larger than a predetermined area is being touched on the touch screen.

3. A computer system comprising:
   a central processing unit (CPU), a computer readable memory, and a computer readable storage medium;
   first program instructions to detect an unintentional touching of a touch screen, wherein the touch screen is a component of a portable computing device that comprises an orientation sensor;
   second program instructions to, in response to detecting the unintentional touching of the touch screen, disable a predetermined region of the touch screen, wherein said disabling prevents unintentional inputs to the touch screen;
   third program instructions to receive outputs from the orientation sensor indicating that the portable computing device is being handed from a first person to a second person, wherein the orientation sensor detects acceleration, yaw, pitch and roll movement indicative of the portable computing device being handed from the first person to the second person, and wherein the yaw is a rotating movement of the portable computing device indicating that the portable computing device is being turned around for the second person to see during a hand-off of the portable computing device from the first person to the second person; and
   fourth program instructions to, in response to detecting that the portable computing device is being handed from the first person to the second person based on received outputs from the orientation sensor, block all touch inputs to the touch screen while the portable computing device is being handed from the first person to the second person; and wherein the first, second, third, and fourth program instructions are stored on the computer readable storage medium for execution by the CPU via the computer readable memory.

4. The computer system of claim 3, further comprising:
fifth program instructions to determine that the touch screen is being unintentionally touched by detecting that an area that is larger than a predetermined area is being touched on the touch screen; and wherein the fifth program instructions are stored on the computer readable storage medium for execution by the CPU via the computer readable memory.

5. The computer system of claim 3, wherein the predetermined region of the touch screen being disabled covers all of the touch screen.

6. The computer program product of claim 1, wherein the method further comprises:
identifying multiple fingertip-touched areas on the touch screen;
determining that the multiple fingertip-touched areas are inadvertent touchings of the touch screen;
forming a polygonal area on the touch screen using connections lines between the multiple fingertip-touched areas; and
disabling the polygonal area on the touch screen.

7. The computer program product of claim 1, wherein the method further comprises:
receiving an input from a user identifying a specific time period as being dedicated to presenting video content on the touch screen;
detecting that a text-processing program has been opened during the specific time period, wherein opening the text-processing program populates the touch screen with a touch-screen keyboard; and
ignoring any touch screen inputs from the touch-screen keyboard during the specific time period.

8. The computer program product of claim 1, wherein the method further comprises:
detecting a cessation of the unintentional touching of the touch screen; and
in response to detecting the cessation of the unintentional touching of the touch screen, automatically re-enabling the predetermined region of the touch screen to receive touch inputs.

9. The computer program product of claim 1, wherein the method further comprises:
receiving a history of unintentional previous touchings of the touch screen;
generating a pattern of unintentional previous touchings of the touch screen based on the history of unintentional touchings of the touch screen;
generating a pattern of a current unintentional touching of a touch screen;
comparing the pattern of the current unintentional touching of a touch screen with the pattern of unintentional previous touchings of the touch screen; and
in response to determining that the pattern of the current unintentional touching of a touch screen matches the pattern of unintentional previous touchings of the touch screen, disabling all of the touch screen to prevent touch inputs to any part of the touch screen.

10. The computer system of claim 3, further comprising:
fifth program instructions to identify multiple fingertip-touched areas on the touch screen;
sixth program instructions to determine that the multiple fingertip-touched areas are inadvertent touchings of the touch screen;
seventh program instructions to form a polygonal area on the touch screen using connections lines between the multiple fingertip-touched areas; and
eighth program instructions to disable the polygonal area on the touch screen; and wherein
the fifth, sixth, seventh, and eighth program instructions are stored on the computer readable storage medium for execution by the CPU via the computer readable memory.

11. The computer system of claim 3, further comprising:
fifth program instructions to receive an input from a user identifying a specific time period as being dedicated to presenting video content on the touch screen;
sixth program instructions to detect that a text-processing program has been opened during the specific time period, wherein opening the text-processing program populates the touch screen with a touch-screen keyboard; and
seventh program instructions to ignore any touch screen inputs from the touch-screen keyboard during the specific time period; and wherein the fifth, sixth, and seventh program instructions are stored on the computer readable storage medium for execution by the CPU via the computer readable memory.

12. The computer system of claim 3, further comprising:
fifth program instructions to detect a cessation of the unintentional touching of the touch screen; and
sixth program instructions to, in response to detecting the cessation of the unintentional touching of the touch screen, automatically re-enable the predetermined region of the touch screen to receive touch inputs; and wherein the fifth and sixth program instructions are stored on the computer readable storage medium for execution by the CPU via the computer readable memory.

13. The computer system of claim 3, further comprising:
fifth program instructions to receive a history of unintentional previous touchings of the touch screen;
sixth program instructions to generate a pattern of unintentional previous touchings of the touch screen based on the history of unintentional touchings of the touch screen;
seventh program instructions to generate a pattern of a current unintentional touching of a touch screen;
eighth program instructions to compare the pattern of the current unintentional touching of a touch screen with the pattern of unintentional previous touchings of the touch screen; and
ninth program instructions to, in response to determining that the pattern of the current unintentional touching of a touch screen matches the pattern of unintentional previous touchings of the touch screen, disable all of the touch screen to prevent touch inputs to any part of the touch screen; and wherein the fifth, sixth, seventh, eighth, and ninth program instructions are stored on the computer readable storage medium for execution by the CPU via the computer readable memory.

* * * * *